US011250497B2

(12) United States Patent
Debusmann et al.

(10) Patent No.: US 11,250,497 B2
(45) Date of Patent: Feb. 15, 2022

(54) DATA GENERATION IN DIGITAL ADVERTISING ECOSYSTEMS

(71) Applicant: SAP SE, Walldorf (DE)

(72) Inventors: Ralph Debusmann, Ludwigsburg (DE); Ioannis Stratakos, Heidelberg (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 16/012,062

(22) Filed: Jun. 19, 2018

(65) Prior Publication Data

US 2019/0355051 A1 Nov. 21, 2019

(30) Foreign Application Priority Data

May 16, 2018 (GR) .............................. 20180100207

(51) Int. Cl.
*G06Q 30/00* (2012.01)
*G06Q 30/08* (2012.01)
*G06Q 30/02* (2012.01)

(52) U.S. Cl.
CPC ......... *G06Q 30/08* (2013.01); *G06Q 30/0201* (2013.01); *G06Q 30/0242* (2013.01); *G06Q 30/0277* (2013.01)

(58) Field of Classification Search
None
See application file for complete search history.

(56) References Cited

U.S. PATENT DOCUMENTS

| 8,352,919 | B2 | 1/2013 | Misch et al. |
| 9,430,253 | B2 * | 8/2016 | Debusmann ........ G06F 9/44521 |
| 9,600,269 | B1 | 3/2017 | Bregler et al. |
| 9,633,378 | B1 * | 4/2017 | Nath ................. G06Q 30/0277 |

(Continued)

FOREIGN PATENT DOCUMENTS

| JP | 2014093080 A | * | 5/2014 | ............. G06F 11/00 |
| JP | 2014102663 A | * | 6/2014 | ............. G06Q 30/02 |

(Continued)

OTHER PUBLICATIONS

Chen et al. Real-Time Bidding Algorithms for Performance-Based Display Ad Allocation. (Jun. 24, 2011). Retrieved online Oct. 28, 2020. https://citeseerx.ist.psu.edu/viewdoc/download?doi=10.1.1.232.1080&rep=rep1&type=pdf (Year: 2011).*

(Continued)

*Primary Examiner* — James A Reagan
(74) *Attorney, Agent, or Firm* — Fish & Richardson P.C.

(57) ABSTRACT

Methods, systems, and computer-readable storage media for computer-implemented simulation of a digital advertising system to generate data. Actions include executing a plurality of actors, each actor being provided as computer-executable code including functionality of a respective component of a digital advertising system, and including one or more configuration parameters, during a simulated real-time bidding (RTB) process, transmitting, by each actor, at least one message to another actor, each message representing a transaction between actors in the digital advertising system, and being at least partially based on the one or more configuration parameters of a respective actor, and logging data representative of transactions occurring during the simulated RTB process.

20 Claims, 5 Drawing Sheets

(56) References Cited

U.S. PATENT DOCUMENTS

| | | | |
|---|---|---|---|
| 9,747,618 B1* | 8/2017 | Reiss | G06Q 30/0275 |
| 10,559,001 B1* | 2/2020 | Bradley | G06F 3/1222 |
| 10,650,416 B1* | 5/2020 | Bell | G06Q 30/0275 |
| 2010/0257054 A1* | 10/2010 | Martin | G06Q 30/02 |
| | | | 705/14.46 |
| 2011/0040636 A1* | 2/2011 | Simmons | G06Q 30/0243 |
| | | | 705/14.71 |
| 2011/0191169 A1* | 8/2011 | Cui | G06Q 30/0247 |
| | | | 705/14.46 |
| 2011/0191170 A1* | 8/2011 | Zhang | G06Q 30/0247 |
| | | | 705/14.46 |
| 2012/0036023 A1* | 2/2012 | Das | G06Q 30/02 |
| | | | 705/14.71 |
| 2012/0323674 A1* | 12/2012 | Simmons | G06Q 30/0249 |
| | | | 705/14.41 |
| 2014/0006141 A1* | 1/2014 | Vassilvitskii | G06Q 30/0241 |
| | | | 705/14.45 |
| 2014/0025509 A1* | 1/2014 | Reisz | G06Q 30/0244 |
| | | | 705/14.71 |
| 2016/0063608 A1* | 3/2016 | Hawilo | H04W 4/21 |
| | | | 705/26.81 |
| 2016/0364772 A1* | 12/2016 | Denton | G06Q 30/0276 |
| 2017/0098236 A1* | 4/2017 | Lee | G06Q 30/0244 |
| 2017/0147311 A1 | 5/2017 | Bregler et al. | |
| 2017/0161793 A1* | 6/2017 | Knapp | G06Q 30/08 |
| 2017/0213255 A1* | 7/2017 | Mysore | G06Q 30/0275 |
| 2018/0137143 A1* | 5/2018 | Brundage | G06K 9/626 |
| 2019/0080363 A1* | 3/2019 | Acuna Agost | G06N 7/005 |
| 2019/0102802 A1* | 4/2019 | Tuschman | G06Q 30/0251 |
| 2019/0287023 A1* | 9/2019 | Kasahara | G06F 12/0607 |
| 2019/0355051 A1* | 11/2019 | Debusmann | G06Q 30/0201 |
| 2020/0050933 A1* | 2/2020 | Tanaka | G06K 9/6285 |
| 2020/0065707 A1* | 2/2020 | Kasahara | G06N 20/00 |
| 2020/0401886 A1* | 12/2020 | Deng | G06N 3/088 |

FOREIGN PATENT DOCUMENTS

| | | | | |
|---|---|---|---|---|
| WO | WO-3065149 A2 * | 8/2003 | | |
| WO | WO-2007009003 A2 * | 1/2007 | | G06Q 30/0641 |

OTHER PUBLICATIONS

C. Perlich et al. Machine learning for targeted display advertising: transfer learning in action. (May 30, 2013). Retrieved online Nov. 24, 2021. https://link.springer.com/article/10.1007/s10994-013-5375-2 (Year: 2013).*

Weinan Zhang et al. Optimal Real-Time Bidding for Display Advertising. (Aug. 2014). Retrieved online Nov. 24, 2021. https://www.researchgate.net/publication/264397624_Optimal_Real-Time_Bidding_for_Display_Advertising (Year: 2014).*

* cited by examiner

DATA GENERATION IN DIGITAL ADVERTISING ECOSYSTEMS

CLAIM OF PRIORITY

This application claims priority under 35 USC § 120 to Greek Patent Application Serial No. 20180100207, filed on May 16, 2018, the entire contents of which are hereby incorporated by reference.

BACKGROUND

Digital advertising generally refers to leveraging Internet-based platforms to provide advertisements to users. For example, digital advertising can include placing advertisements on websites frequented by users. In recent years, digital advertising has been drastically reshaped by real-time bidding (RTB) ecosystems. In general, RTB enables advertisers to buy impressions based on user data (e.g., cookies), according to outlined goals and strategy by bidding in auctions that take place in real-time. To accomplish this, various platforms and components, including demand-side platforms (DSPs), supply-side platforms (SSPs), data management platforms (DMPs), publishers and others, interact. Designing, developing and optimizing such systems, is greatly affected by a dependency on third parties, and the lack of data in the early stages of the development process (the so-called "cold start" issue, where data is lacking at the outset). This is particularly true for approaches based on machine learning (ML)/deep learning (DL).

SUMMARY

Implementations of the present disclosure include computer-implemented methods for digital advertising. More particularly, implementations of the present disclosure are directed to computer-implemented methods for a data generator that simulates the behavior of the different platforms within a digital advertising ecosystem to provide data that can be used to develop the digital advertising ecosystem. In some implementations, actions include executing a plurality of actors, each actor being provided as computer-executable code including functionality of a respective component of a digital advertising system, and including one or more configuration parameters, during a simulated real-time bidding (RTB) process, transmitting, by each actor, at least one message to another actor, each message representing a transaction between actors in the digital advertising system, and being at least partially based on the one or more configuration parameters of a respective actor, and logging data representative of transactions occurring during the simulated RTB process. Other implementations of this aspect include corresponding systems, apparatus, and computer programs, configured to perform the actions of the methods, encoded on computer storage devices.

These and other implementations can each optionally include one or more of the following features: the plurality of actors includes a user actor representative of real-world user that views advertisements, a site actor representative of a website that displays advertisements, and an ad server actor representative of an ad server that requests bids, and receives bid responses during the simulated RTB process; the simulated RTB process includes a first message from the ad server actor to an advertiser actor requesting a bid, a second message from the advertiser actor to the ad server actor to provide a bid response, and a third message from the ad server actor to the site actor to return an ad from the advertiser actor; the ad server actor combines functionality of a demand-side platform (DSP), a supply-side platform (SSP), and an ad exchange; an ad server actor logs each of the transactions with a logger actor by transmitting respective messages to the logger actor; actions further include transmitting a message from an actor to a real-world, non-simulated system, and receiving, by the actor, a response message from the real-world, non-simulated system; and the real-world, non-simulated system comprises one of a DSP, a SSP, and a data management platform (DMP).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for digital advertising. More particularly, implementations of the present disclosure are directed to computer-implemented methods for a data generator that simulates the behavior of the different platforms within a digital advertising ecosystem to provide data that can be used to develop the digital advertising ecosystem. Implementations can include actions of executing a plurality of actors, each actor being provided as computer-executable code including functionality of a respective component of a digital advertising system, and including one or more configuration parameters, during a simulated real-time bidding (RTB) process, transmitting, by each actor, at least one message to another actor, each message representing a transaction between actors in the digital advertising system, and being at least partially based on the one or more configuration parameters of a respective actor, and logging data representative of transactions occurring during the simulated RTB process.

As described herein, implementations of the present disclosure enables automated serving of web-based (online) advertisements in a plurality of forms (e.g., text, graphics, images, and/or videos). Implementations collect information about (simulated) users (e.g. using a data management platform), and enable segmentation of user sets (e.g., using information from the data management platform). Implementations further support participation in micro-auctions to procure online advertisement spaces on web pages.

Figure 1:
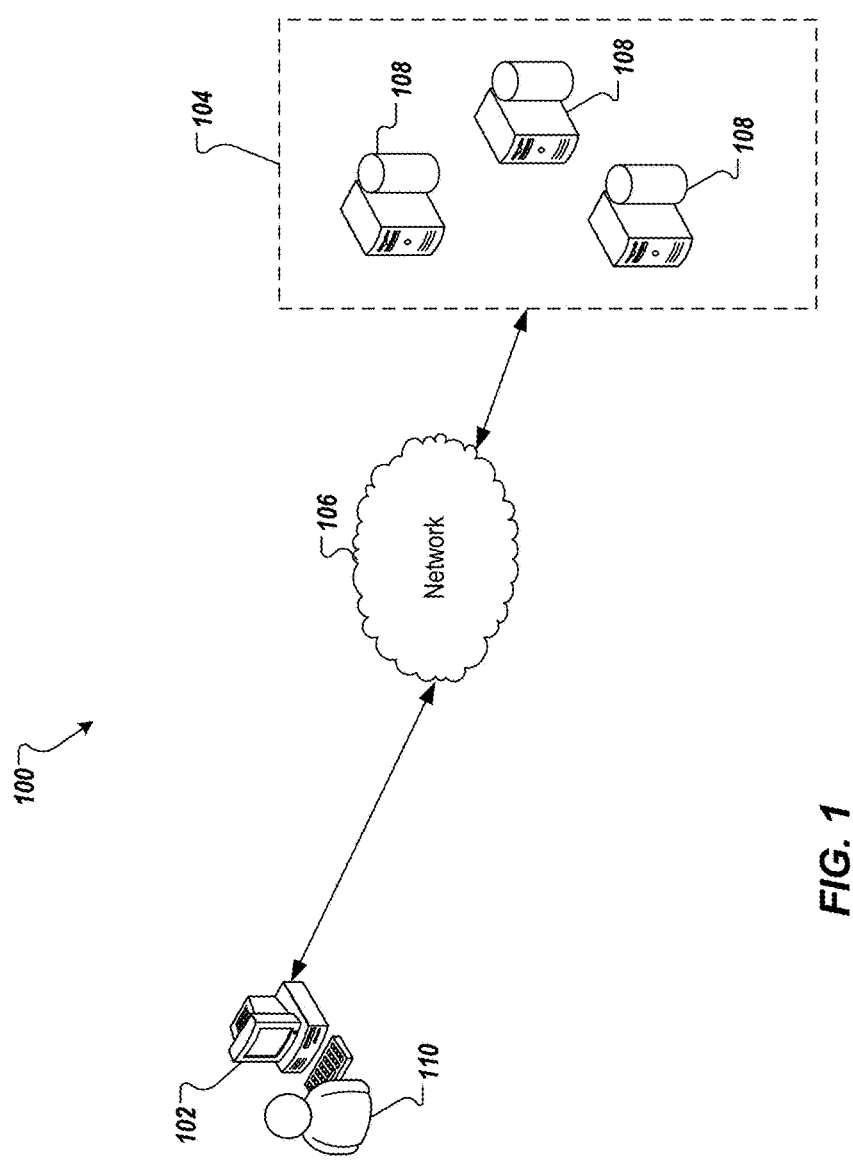
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106. In accordance with implementations of the present disclosure, the server system 104 can host a data generation platform for digital advertising systems, as described in further detail herein.

To provide context for implementations of the present disclosure, developers often face the task of designing data-driven systems without having data. In some instances, machine-learning (ML) models may be developed, and trained with training data. Absence of data can be referred to as a cold-start problem. An example data-driven system that suffers from this problem includes a digital advertising system. For example, data scientists, and/or ML engineers have to provide insights on the data, optimization techniques, and ML models in a digital advertising system. These refer to a variety of tasks, which can include, without limitation, click-through rate prediction, conversion prediction, bid landscaping, bid optimization, audience segmentation, bidding strategies, and budget pacing. Each of these example tasks relies on data that can come from third-parties, and that is either unavailable, or very limited.

Further, software testing is an integral part of the development process. Whether this refers to storing logs in a database, simulating traffic on API endpoints, and/or keeping track of internal calculations, all tasks rely on data. The data can either be dummy data (e.g., simulated data), or production data (e.g., data from production systems). Infrastructure testing and component testing is also an important task in this distributed environment. The system not only has to function properly with sample data, but has to be scalable to handle thousands of requests per second. Further, the ability to define the limitations of the designed architecture and selected technologies is needed.

While there are tools that assist developers with these tasks individually, there is an absence for a tool specific to digital advertising systems, which combines all of the above-described aspects in a highly customizable manner.

In view of the foregoing, implementations of the present disclosure provide a data generation platform (also referred to herein as a data generator) that is specific to digital advertising systems. In accordance with implementations of the present disclosure, and as described in further detail herein, the data generator simulates the behavior of the different platforms operating within a digital advertising system. In some implementations, the data generator is based on the Actor Model. In some examples, the Actor Model can be described as a mathematical model of concurrent computation that treats "actors" as universal primitives of concurrent computation. In the context of a digital advertising system, entities can include the various interacting platforms, described in further detail herein. In the Actor Model, each entity is an actor that can communicate only by messages, while internal processes are protected from external access. In response to a message that an actor receives, the actor can perform one or more tasks. Example tasks include, without limitation, making local decisions (e.g., intra-platform decisions), create more actors, send one or more messages, and determine how to respond to the next message received. While an actor is able to change its own state, the actor can only affect another actor through messages.

In accordance with implementations of the present disclosure, entities of a digital advertising system are provided as respective actors in the Actor Model to model the digital advertising system. In this manner, the basic architecture of the digital advertising system can be expanded to include more roles, and functionality, and a mixture of real production systems, and real humans (e.g. test users) can be provided in simulations.

In a digital advertising system, example entities (actors) include, without limitation, users (e.g., users that visit websites), websites, publishers, supply-side platforms (SSPs), ad exchanges (e.g., a digital marketplace that enables advertisers and publishers to buy and sell advertising space, in some instances, using real-time bidding (RTB)), and advertisers (e.g., demand-side platforms (DSPs)). In some examples, a user initiates a visit to a site (e.g., web page of a web site), and receives an impression. Based on the impression received, the user can decide whether to click on an advertisement, and/or to convert. In some examples, an impression can be described as a view of an advertisement (e.g., the ad loads to a web page, and is displayed in front of the user (equals one impression)). In some examples, a click includes the user clicking on the displayed advertisement (e.g., to navigate to a website of the advertiser). In some examples, a conversion includes an action the user takes after a click (e.g., filling out a form, downloading a file, subscribing to a service, making an online purchase).

In some examples, a website receives visits from users, and forwards ad requests to an SSP, or an ad exchange. The website displays an advertisement to the user (resulting in an impression). In some examples, a bidding process occurs between advertisers (e.g., a RTB)), and an advertisement of the winning bidder is displayed after the auction completes. In some examples, the auction occurs in real-time (e.g., as the web page is being rendered). In some examples, the auction can be at least partially based on information associated with the user, who requested the web page (e.g., demographics, location).

In some examples, an ad server receives ad requests, and initiates auctions by transmitting bid requests to advertisers (e.g., transmitting a bid request to a server system operated by, or on behalf of an advertiser). In some examples, the bid request at least partially includes information associated with the user, and/or the web page that is to be displayed to the user. In response to the bid request, the advertiser determines a bid response (e.g., bid amount). In some examples, the bid response is determined at least partially based on the information associated with the user, and/or the web page (e.g., website owner, ad size/location within the web page) that is to be displayed to the user. The ad server receives multiple bid responses, and determines a winner (e.g., the advertiser with the highest bid wins). In some examples, the ad server transmits a win notice to the winning advertiser, and, in response, the advertiser transmits the content of the ad for display within the web page.

For digital advertising systems, data can represent interactions between the various components and systems. Further, digital advertising systems can be dynamic in that the number of components/systems can change (e.g., in real-time). An example of this, is the number of users, and/or web pages that are to be displayed to the users, both of which continuously change. Other examples include the number of advertisers, ad servers, and the like, which can vary over time.

In view of this, implementations of the present disclosure enable scaling of the actors to represent dynamics within the digital advertising system. In this manner, implementations of the present disclosure provide data that is as realistic as production data. For example, the data provided by implementations of the present disclosure can be indistinguishable from production data. To achieve that various aspects, have to be taken into consideration, including the fuzzy behavior of the user, the existence of a highly competitive environment among advertisers and the large number of strategies that could be applied by the advertisers or DSPs, all of which have to be highly and easily customizable. This flexibility makes it appropriate for the ML research to be carried out on the digital advertising system, for example.

In some implementations, one or more production systems, and/or external services can be added to the simulation environment of the present disclosure. That is, for example, one or more actors can receive messages from, and/or transmit messages to one or more production systems, and/or external services. For example, a data management platform (DMP) that stores information associated with users (e.g., behavior) can communicate with the actor(s). As other examples, information or other enrichment services that provide further information regarding geographical location, referrer page, device type, weather, and the like can be in communication with the actor(s).

In another example, the simulation environment of the present disclosure can interact with an external, non-simulated, production DSP. In some examples, data gathered through interactions with the DSP can enable analysis, and/or reverse engineering of the DSP's internal processes, and bidding strategies. For example, the data could be analyzed to test how bidding responses, and bidding strategies of the DSP adapt to competition in an auction. In some examples, competitor DSPs can be simulated (e.g., provided as actors), and can employ strategies that cause the production DSP to take immediate action (e.g., high loss rate, the DSP loses most of the auctions and needs to raise bid responses in order to consume campaign budget).

Figure 2:
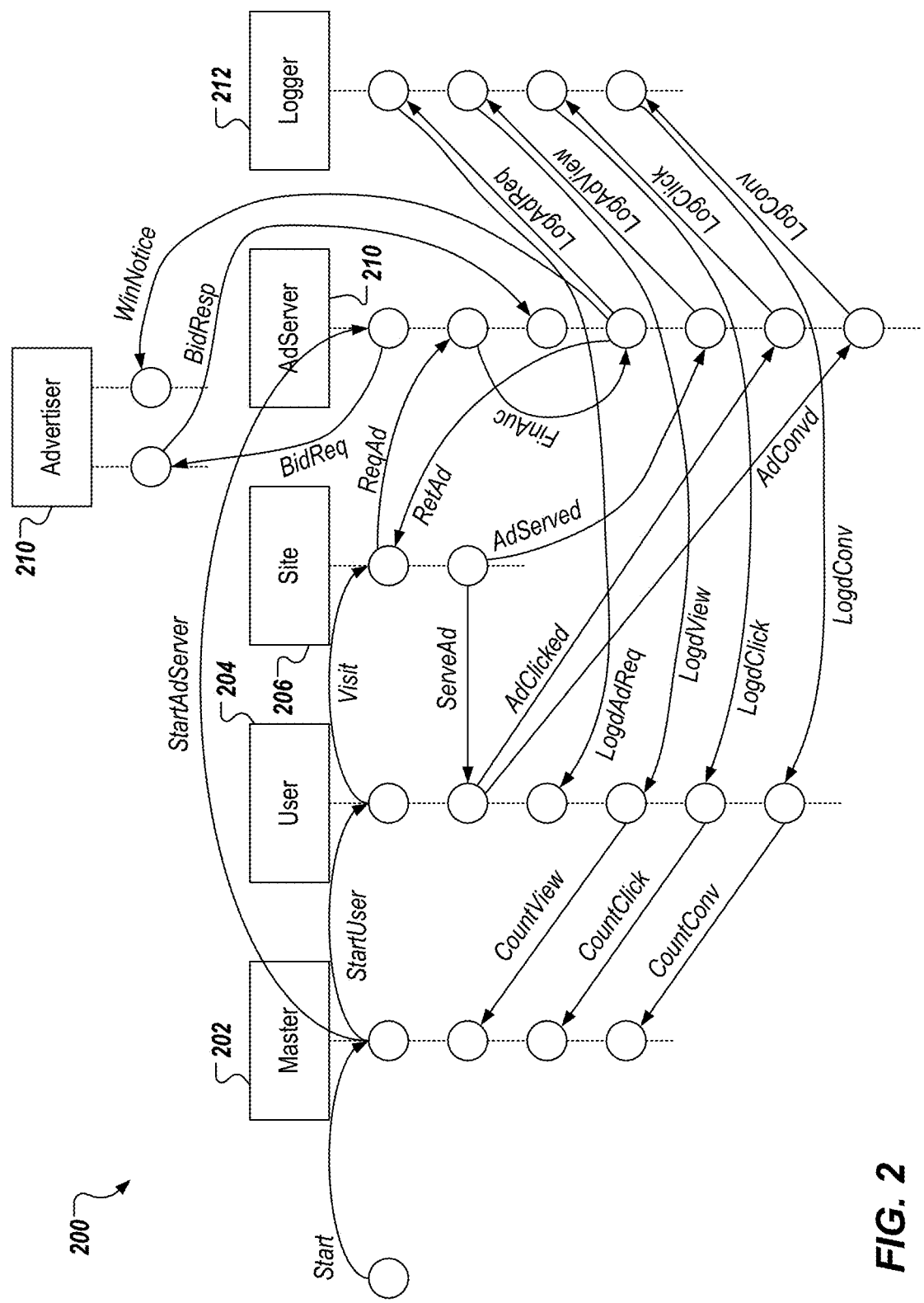
FIG. 2 depicts an example conceptual architecture in accordance with implementations of the present disclosure.
Figure 3:
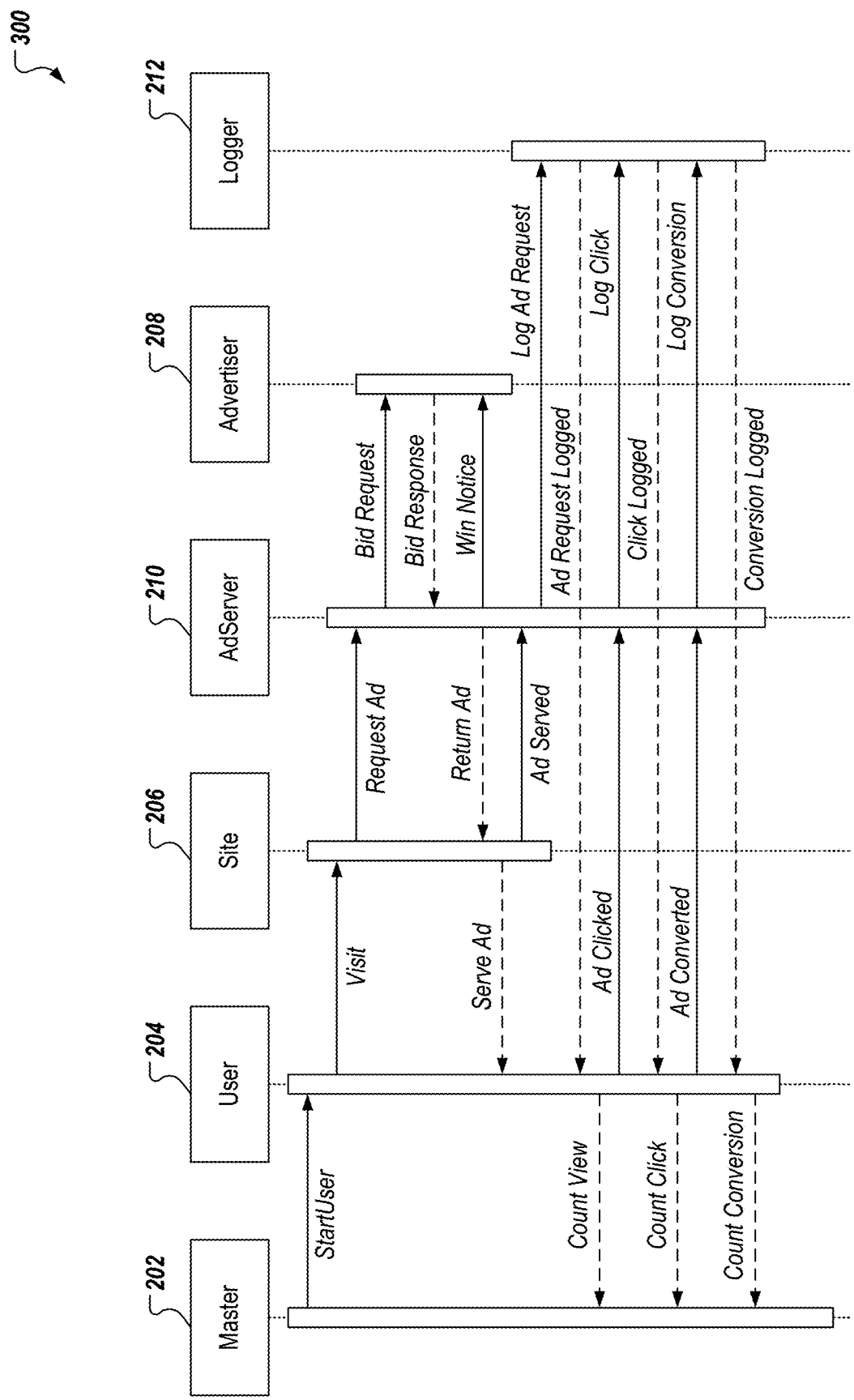
FIG. 3 depicts an example sequence diagram in accordance with implementations of the present disclosure.

FIG. 2 depicts an example conceptual architecture 200 in accordance with implementations of the present disclosure. The example conceptual architecture 200 includes depicts example actors in a digital advertising system. The example actors include a master actor 202, a user actor 204, a site actor 206, an advertiser actor 208, an ad server actor 210, and a logger actor 212. FIG. 3 depicts an example sequence diagram 300 in accordance with implementations of the present disclosure. The example sequence diagram 300 depicts example messages between the actors depicted in FIG. 2.

In some implementations, the master actor 202 coordinates execution of simulations in the example architecture 200, and aggregates data generated by the simulations (e.g., number of views (CountView), number of clicks (CountClick), number of conversions (CountConv)). In some implementations, the user actor 204 simulates a user and can have one or more parameters to represent a particular user. That is, for example, parameters can be used to represent information associated with a user (e.g., demographics, location). As another example, parameters can be used to represent behavior of a user (e.g., delay in clicking on an ad). In some examples, multiple user actors 204 can be provided, the user actors 204 having different parameter settings to simulate different users.

In some implementations, the site actor 206 simulates a website that can be visited by the user actor 204. In some examples, the site actor 206 can have one or more parameters to represent a particular website. That is, for example, parameters can be used to represent information associated with a website, or web page (e.g., number of advertisement spaces, locations, sizes). In some examples, multiple site actors 206 can be provided, the site actors 206 having different parameter settings to simulate different websites.

In some implementations, the ad server actor 210 simulates an ad server that coordinates a RTB process. In some examples, the ad server actor 210 can have one or more parameters to represent a particular ad server. That is, for example, parameters can be used to represent information associated with an ad server. In some examples, multiple ad server actors 210 can be provided, the ad server actors 210 having different parameter settings to simulate different ad servers. In some implementations, the advertiser actor 208 simulates an advertiser that bids in the RTB process, and provides advertisements (e.g., digital content to be displayed on web pages). That is, the advertiser actor 208 simulates a computer-implemented system of an entity that provides advertisements. In some examples, the advertiser actor 208 can have one or more parameters to represent a particular advertiser system. That is, for example, parameters can be used to represent information associated with an advertiser system. In some examples, multiple advertiser actors 208 can be provided, the advertiser actors 208 having different parameter settings to simulate different advertiser systems.

In some implementations, the logger actor 212 logs interactions (data) occurring during the simulations. As described herein, the data can be used to engineer, modify, and/or optimize, among other tasks, digital advertising systems. For example, the data can be used to train a ML model.

In some implementations, each actor is provided using computer-executable code that is executed by one or more processors. In some examples, each actor performs one or more functions, which reflect functions the particular actor would perform in a real-world digital advertising system. For example, example functions of the user actor 204 can include, without limitation, visiting websites, receiving ads, clicking on ads, and generating conversion. Further, messages included in the user actor refer to messages that the user actor can receive. Example messages include, without limitation, initialization of the user actor ("StartUser"), receiving the impression ("ServeAd"), logging an event from the logger ("LogdAdReq," "LogdView," "LogdClick," "LogdConv"). Example pseudo-code for the user actor can be provided as:

Listing 1: Example User Actor Pseudo-Code

```
object UserActor {
  case class StartUser( )
  case class ServedAd(impressionId, siteInfo, advertiserInfo)
  case class LoggedAdRequest(impressionId)
  case class LoggedView(impressionId)
  case class LoggedClick(impressionId)
  case class LoggedConversion(impressionId)
  case class UserInfo( ) { /* contains information about the user */ }
}
class UserActor( )
  private var siteVisitsPerformed = 0
  val userInfo = UserInfo( )
  private def scheduleNextVisitORStop( ) = {
    if (siteVisitsPerformed < visitsToPerform) this.self !
StartUser( )
    else context.stop(self)
  }
  override def receive = {
    case StartUser( ) => handleStartUserMsg( )
    case ServeAd(impressionIdLong, siteInfo, advertiserInfo) =>
      handleIncomingAd( )
      executeClickEvent( )
      executeConversionEvent( )
    case LoggedView(impressionId) =>
      masterActorRef ! CountView(impressionId)
      scheduleNextVisitORStop( )
    case LoggedClick(impressionIdLong) =>
      masterActorRef ! CountClick(impressionId)
      scheduleNextVisit( )
    case LoggedConversion(impressionIdLong) =>
      masterActorRef ! CountConversion(impressionId)
      scheduleNextVisitORStop( )
  }
}
```

As another example, the ad server actor can include a broadcast router, which is responsible for forwarding incoming ad requests to all connected advertiser actors. In some examples, an in-memory repository (e.g., FIFO queue) keeps track of the information about the last initiated auctions, and their outcomes, in order to deliver the win notice to the advertiser with the winning bid. In some examples, the ad server receives feedback events from the user actor (e.g., impression, click, conversion), sends messages to the logger to be forwarded through the communication channel, and also maintains statistics about incoming requests, and events. Example pseudo-code for the ad server actor can be provided as:

Listing 2: Example Ad Server Actor Pseudo-Code

```
object AdServerActor {
  case class StartAdServer(adServerIdInt)
  case class RequestAdRTB(userInfo, siteInfo)
  case class BidResponse(impressionId, advertiserInfo, bidPrice)
  case class AdServed(impressionId, userActorRef)
  case class AdClicked(impressionId, userActorRef)
  case class AdConverted(impressionId, userActorRef)
}
class AdServerActor extends Actor with ActorLogging{
  private val repo: RequestRepo = new RequestRepo(100)
  private var requestsReceived: Long = 0
  private var viewsCounter: Long = 0
  private var clicksCounter: Long = 0
  private var conversionsCounter: Long = 0
  //
  private val advertiserRouteesList: IndexedSeq[Routee] = (1 to
NumAdvertisers).map{i =>
    val r = context.actorOf(AdvertiserActor.props(i),
    s"Advertiser_$i")
    ActorRefRoutee(r)
  }
  private val broadcastRouter: Router =
    Router.apply(BroadcastRoutingLogic( ),
    advertiserRouteesList)
  override def receive = {
    case StartAdServer(i) =>
      log.debug(s"AdServer $i started")
    case RequestAdRTB(userInfo, siteInfo) =>
      val impressionIdLong =
      UUID.randomUUID( ).getMostSignificantBits( ) &
      Long.MaxValue
      repo.addRequestEvent(new RequestEvent( ))
      val message = BidRequest(this.self, impressionIdLong,
      userInfo, siteInfo)
      broadcastRouter.route(message, this.self)
    case BidResponse(impressionIdLong, advertiserInfo,
    bidPrice) =>
        handleBidResponse( )
        if (auction.responseList.size == NumAdvertisers) {
          val winner = announceWinner( )
          auction.siteInfo.siteActorRef !
          ReturnAd(impressionIdLong, userInfo,
          winnerResponse)
          winnerResponse.__1.advertiserActorRef !
          WinNotice(impressionIdLong, payingPrice)
          loggerActorOf ! LogBidding(impressionIdLong,
          userInfo, biddingLogEntry)
        }
    case AdServed(impressionIdLong, userActorRef) =>
      viewsCounter += 1
      loggerActorOf ! LogBiddingEvent(impressionId,
      userActorRef, clrPrice, BIDDING_VIEW_EVENT)
    case AdClicked(impressionIdLong, userActorRef) =>
      clicksCounter += 1
      loggerActorOf ! LogBiddingEvent(impressionId,
      userActorRef, clrPrice, BIDDING_CLICK_EVENT)
    case AdConverted(impressionIdLong, userActorRef) =>
      conversionsCounter += 1
      loggerActorOf ! LogBiddingEvent(impressionIdLong,
      userActorRef, clrPrice, BIDDING_CONVERSION_EVENT)
  }
class RequestEvent(...)
class Auction(val impressionIdLong: Long, val userInfo:
  UserInfo, val siteInfo: SiteInfo) {
  var responseList: List[(AdvertiserInfo, Double)] = List( )
  def addBidResponse(advertiserInfo: AdvertiserInfo, bidPrice:
    Double): Unit = responseList = responseList ++
    List((advertiserInfo, bidPrice))
}
class RequestRepo(max_requests: Int) {
  private val MAX_REQUESTS = max_requests
  private var repo: List[RequestEvent] = List( )
  private def removeHead( ) = repo = repo.tail
  //
  def getRequestEvent(impId: Long): Option[RequestEvent] =
    repo.find(_.impressionIdLong == impId)
  def getAuction(impId: Long): Option[Auction] =
    getRequestEvent(impId).get.auction
  def addRequestEvent(event: RequestEvent): Unit = {
```

-continued

Listing 2: Example Ad Server Actor Pseudo-Code

```
    if (repo.length >= MAX_REQUESTS) removeHead( )
    repo = repo ++ List(event)
  }
}
```

In accordance with implementations of the present disclosure, simulations are run to generate data that represents underlying patterns. In some implementations, parameters of each actor can be adjusted to elicit a desired pattern. In some examples, a degree of randomness can be introduced. For example, one or more parameters can be dynamic (e.g., periodically changed using a random value generator).

With continued reference to FIGS. 2 and 3, a start message is sent to the master actor 202 to initiate the simulation. In some examples, the master actor 202 initializes the advertiser actor(s) 208 (StartAdvertiser message), the ad server actor(s) 210 ("StartAdServer" message), and user actor(s) 204 ("StartUser" message). The master actor 202 monitors the impressions occurring during the simulation, and applies a termination condition to stop the simulation. An example termination condition can include a threshold number of impressions being achieved.

In some examples, advertiser actors, and ad server actors are matched with a "m:n" relationship, meaning that an ad server actor 210 may send bid requests to multiple advertiser actors 208, and advertiser actors 208 may be receiving bid requests from multiple ad server actors 210.

In a simulation, the user actor 204 visits a website by sending a Visit message to a site actor 206. User actors 204 can perform one or more site visits to multiple site actors 206. In some examples, a site visit equals one ad request. That is, each site actor 206 includes exactly one advertisement. In response to the Visit message, the site actor 206 requests an advertisement from the ad server actor 210 by sending a request ad (ReqAd) message. In response, the ad server actor 210 initiates an auction by sending bid request (BidReq) messages to the advertiser actors 208. The ad server actor 210 receives the bids from the advertiser actors 210 as bid response (BidResp) messages, determines a winner of the auction, and announces the winner. For example, the ad server actor 210 sends a win notice (WinNotice) message to the winning advertiser actor 208. In some examples, when the auction finishes, the ad server actor 210 logs the ad request by sending a LogAdReq message to the logger actor 22, and returns the ad to the site actor 206 using a return ad (RetAd message).

In response to receiving the RetAd message, the site actor 206 serves the ad to the user actor 204 using a serve ad (ServeAd) message, and acknowledges to the ad server actor 210 that the ad has been served using an ad served (AdServed) message. The ad server actor 210 logs a view event by sending a log view (LogView) message to the logger actor 212.

At some point in time, and depending on the click-through rate (CTR) configuration of the user, for example, the user may click-on/convert respectively using an ad clicked (AdClicked) message, and ad converted (AdConvd) message to the ad server actor 210. The ad server actor 210 logs the click, and/or conversion events using respective messages (LogClick, LogConv) to the logger actor 212.

In the examples of FIGS. 2 and 3, simplifications have been applied. For example, the behavior of the SSP, DSP, and ad exchange have been joined in a single component, namely, the ad server actor 210, which brings websites and advertisers into contact. This shows that the architecture 200 is expandable by adding actors with more functionality in order to support more use case scenarios, but at the same time reduce complexity when applicable. In this manner, simulations can be more efficient in terms of technical resources used to execute the simulations.

Implementations of the present disclosure provide scalability, adaptability, flexibility, and high throughput for providing data that represents interactions in digital advertising systems. In some implementations, actors can be provided using Scala, a functional, object-oriented programming language. In some examples, a toolkit can be used to provide implementations of the present disclosure. An example toolkit includes Akka, which can be described an open-source toolkit and runtime that can be used for constructing concurrent and distributed applications (e.g., actors written in Scala). In some examples, the actors can either simulate components of the digital advertising system, or act as wrappers of production systems. In some examples, a communication channel is provided for messaging between the components. An example communication channel includes Kafka, which can be described as a stream processing platform that provides high-throughput, and low latency for real-time messaging feeds. In some examples, communication can also take place with ReST API endpoints, as Akka HTTP provides this functionality.

Figure 4:
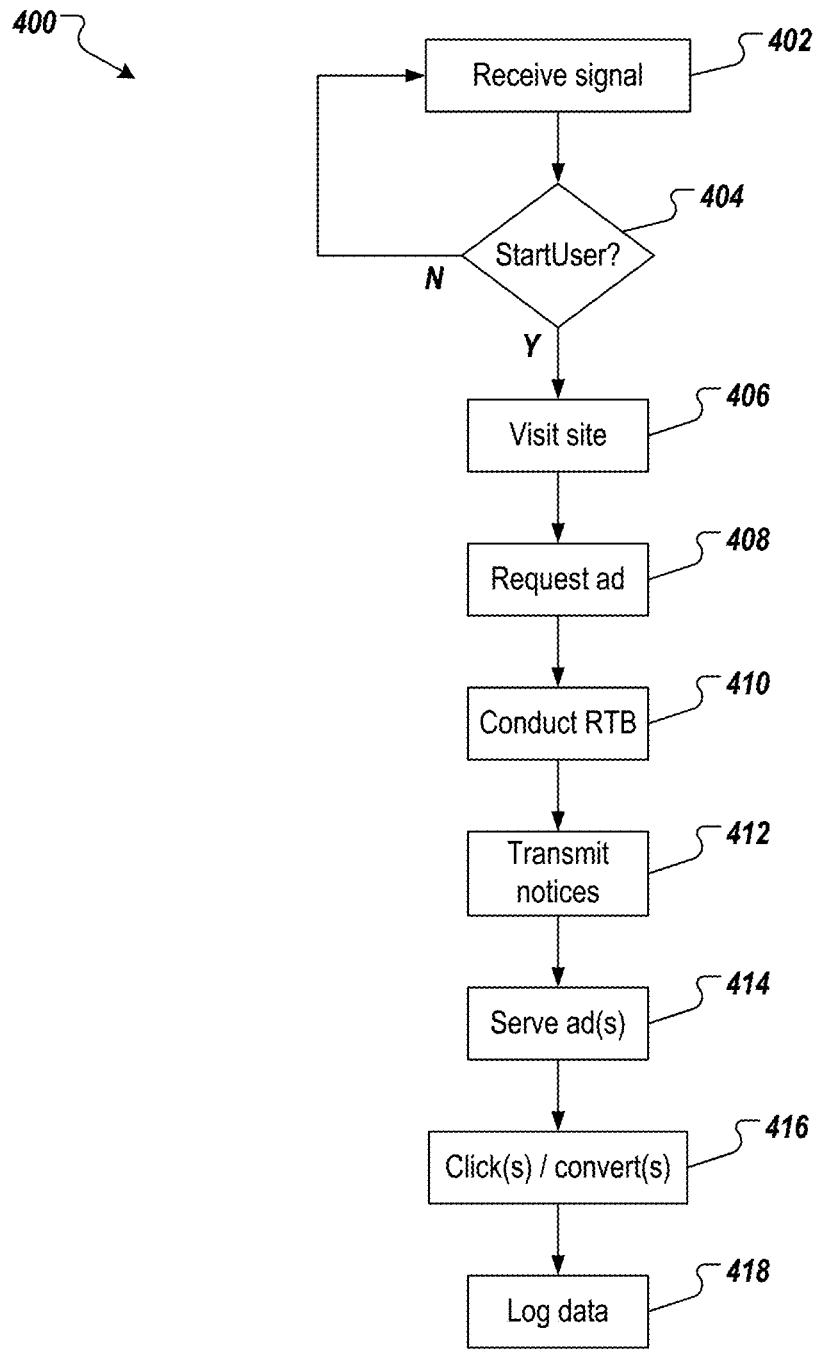
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

Receive signal (402). For example, a signal is transmitted from the master actor 202 to one or more user actors 204 (see, e.g., FIG. 3) as respective messages. It is determined whether the signal is a StartUser signal (404). For example, each user actor 204 that receives the signal can determine whether the signal is a StartUser signal. If the signal is not a StartUser signal, the example process 400 loops back. If the signal is a StartUser signal, one or more site visits are executed (406). In some examples, one or more user actors 204 transmit a message to one or more site actors 206. In some examples, each message represents a visit to a respective website (e.g., navigation to a web page of a website).

One or more advertisements are requested (408). In some examples, each site actor 206 that received a visit message transmits an ad request message to one or more ad server actors 210. A RTB process is conducted (410). For example, each of the one or more ad server actors 210 initiates a RTB process with one or more advertiser actors 208. In some examples, the RTB process is performed based on transmission of messages from an ad server actor 210 to the one or more advertiser actors 208. In some examples, content of the message is based on configuration parameters of one or more of the user actor 204, the site actor 206, and the ad server actor 210. In some examples, the RTB process includes transmission of messages from the advertiser actors 208 to the ad server actor 210. In some examples, content of the message includes a bid amount that is based on configuration parameters of the advertiser actor 208.

One or more notices are transmitted (412). For example, the ad server actor 210 transmits one or more win notices, each win notice is transmitted as a message to a respective advertiser actor 208. One or more ads are served (414). For example, an advertiser actor 208 transmits a message including ad content to an ad server actor 208, which serves a respective ad to a site actor 206 as a message. One or more clicks, and/or one or more conversions occur (416). For example, a site actor 206 transmits an ad as a message to the user actor 204, the message including content of the advertisement. In response to the message, and depending on the configuration parameters of the particular user actor 204, the user actor 204 can provide a click message, and/or a convert message (e.g., to the ad server actor 210). Data is logged (418). For example, and as described herein, data representing the RTB process, the respective actors, and the respective results are logged in a data logger 212.

Figure 5:
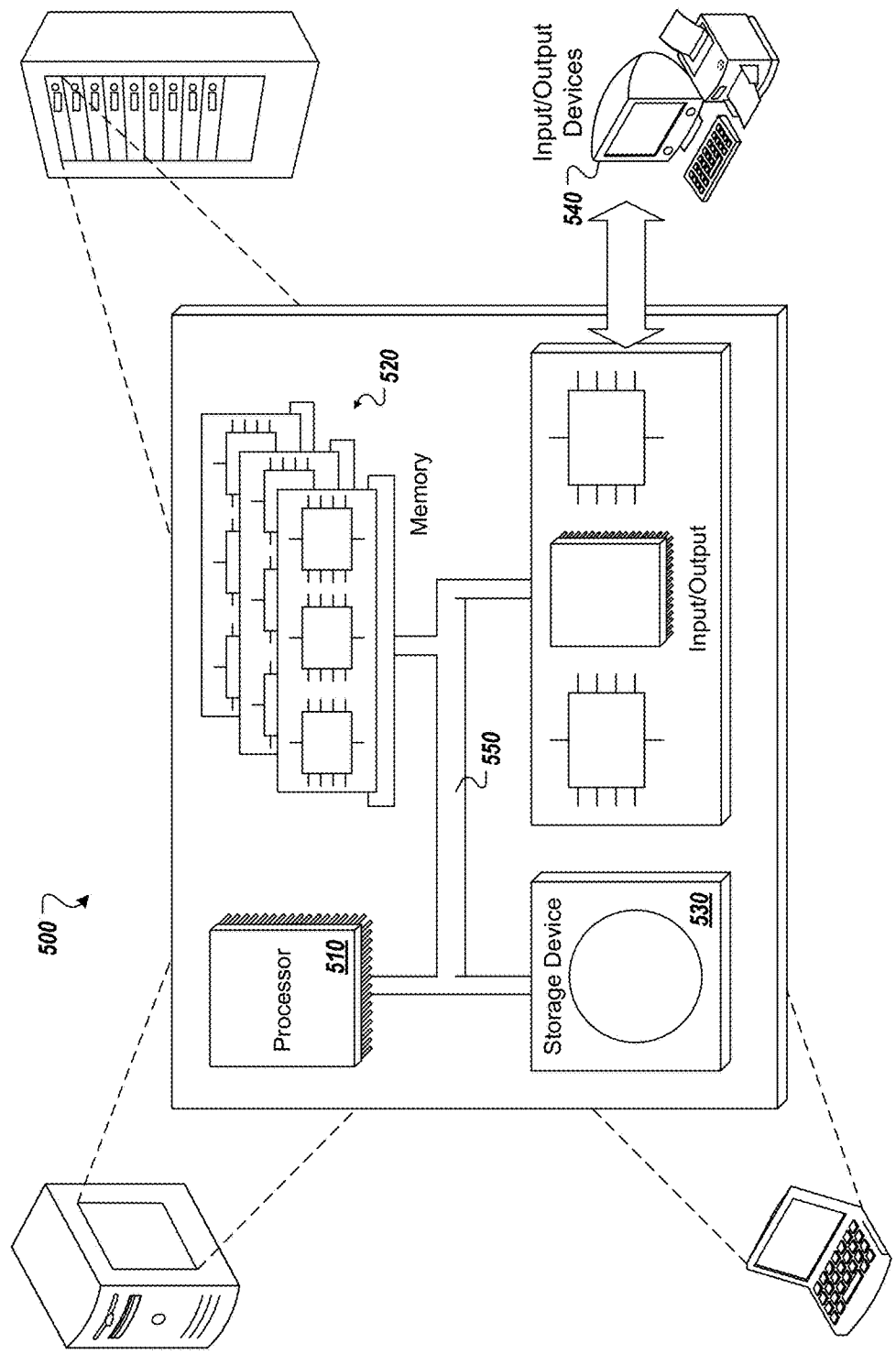
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method for computer-implemented simulation of a digital advertising system to generate data, the method being executed by one or more processors and comprising:

providing a data generation platform comprising a plurality of actors that model a digital advertising system, each actor being provided as computer-executable code comprising functionality of a respective component of the digital advertising system that is modeled and comprising one or more configuration parameters, the plurality of actors comprising a user actor representative of real-world user that views advertisements, a site actor representative of a web site that displays advertisements, and an ad server actor representative of an ad server that requests bids, and receives bid responses during the simulated RTB process, the ad server actor being configured to execute functionality of each of a demand-side platform (DSP), a supply-side platform (SSP), and an ad exchange;

receiving, by a master actor of the plurality of actors, a start message to initiate a simulated real-time bidding (RTB) process within the data generation platform, the master actor being configured to:
  coordinate execution of the simulated RTB process, aggregate data generated by the simulated RTB process,
  initiate each simulation by initializing at least two types of actors in response to the start message and transmitting respective messages to the at least two types of actors in the plurality of actors, and
  terminate the simulated RTB process in response to a termination condition, the termination condition comprising a threshold number of impressions being achieved during the simulated RTB process;

during the simulated RTB process, transmitting, by each actor, at least one message to another actor, each message representing a transaction between actors in the digital advertising system, and being at least partially based on the one or more configuration parameters of a respective actor; and logging data representative of transactions occurring during the simulated RTB process, the data being indistinguishable from production data.

2. The method of claim 1, wherein the simulated RTB process comprises a first message from the ad server actor to an advertiser actor requesting a bid, a second message from the advertiser actor to the ad server actor to provide a bid response, and a third message from the ad server actor to the site actor to return an ad from the advertiser actor.

3. The method of claim 1, wherein an ad server actor logs each of the transactions with a logger actor by transmitting respective messages to the logger actor.

4. The method of claim 1, further comprising transmitting a message from an actor to a real-world, non-simulated system, and receiving, by the actor, a response message from the real-world, non-simulated system.

5. The method of claim 4, wherein the real-world, non-simulated system comprises one of a DSP, a SSP, and a data management platform (DMP).

6. The method of claim 1, wherein the data representative of transactions occurring during the simulated RTB process is used to train one or more machine learning (ML) models.

7. The method of claim 1, wherein the data representative of transactions occurring during the simulated RTB process is used to test infrastructure of the digital advertising system.

8. A non-transitory computer-readable storage medium coupled to one or more processors and having instructions stored thereon which, when executed by the one or more processors, cause the one or more processors to perform operations for computer-implemented simulation of a digital advertising system to generate data, the operations comprising:

providing a data generation platform comprising a plurality of actors that model a digital advertising system, each actor being provided as computer-executable code comprising functionality of a respective component of the digital advertising system that is modeled and comprising one or more configuration parameters, the plurality of actors comprising a user actor representative of real-world user that views advertisements, a site actor representative of a web site that displays advertisements, and an ad server actor representative of an ad server that requests bids, and receives bid responses during the simulated RTB process, the ad server actor being configured to execute functionality of each of a demand-side platform (DSP), a supply-side platform (SSP), and an ad exchange;

receiving, by a master actor of the plurality of actors, a start message to initiate a simulated real-time bidding (RTB) process within the data generation platform, the master actor being configured to:
  coordinate execution of the simulated RTB process, aggregate data generated by the simulated RTB process,
  initiate each simulation by initializing at least two types of actors in response to the start message and transmitting respective messages to the at least two types of actors in the plurality of actors, and
  terminate the simulated RTB process in response to a termination condition, the termination condition comprising a threshold number of impressions being achieved during the simulated RTB process;

during the simulated RTB process, transmitting, by each actor, at least one message to another actor, each message representing a transaction between actors in the digital advertising system, and being at least partially based on the one or more configuration parameters of a respective actor; and logging data representative of transactions occurring during the simulated RTB process, the data being indistinguishable from production data.

9. The computer-readable storage medium of claim 8, wherein the simulated RTB process comprises a first message from the ad server actor to an advertiser actor requesting a bid, a second message from the advertiser actor to the ad server actor to provide a bid response, and a third message from the ad server actor to the site actor to return an ad from the advertiser actor.

10. The computer-readable storage medium of claim 8, wherein an ad server actor logs each of the transactions with a logger actor by transmitting respective messages to the logger actor.

11. The computer-readable storage medium of claim 8, wherein operations further comprise transmitting a message from an actor to a real-world, non-simulated system, and receiving, by the actor, a response message from the real-world, non-simulated system.

12. The computer-readable storage medium of claim 11, wherein the real-world, non-simulated system comprises one of a DSP, a SSP, and a data management platform (DMP).

13. The computer-readable storage medium of claim 8, wherein the data representative of transactions occurring during the simulated RTB process is used to train one or more machine learning (ML) models.

14. The computer-readable storage medium of claim 8, wherein the data representative of transactions occurring during the simulated RTB process is used to test infrastructure of the digital advertising system.

15. A system, comprising:
a computing device; and
a computer-readable storage device coupled to the computing device and having instructions stored thereon which, when executed by the computing device, cause the computing device to perform operations for computer-implemented simulation of a digital advertising system to generate data, the operations comprising:

providing a data generation platform comprising a plurality of actors that model a digital advertising system, each actor being provided as computer-executable code comprising functionality of a respective component of the digital advertising system that is modeled and comprising one or more configuration parameters, the plurality of actors comprising a user actor representative of real-world user that views advertisements, a site actor representative of a web site that displays advertisements, and an ad server actor representative of an ad server that requests bids, and receives bid responses during the simulated RTB process, the ad server actor being configured to execute functionality of each of a demand-side platform (DSP), a supply-side platform (SSP), and an ad exchange;

receiving, by a master actor of the plurality of actors, a start message to initiate a simulated real-time bidding (RTB) process within the data generation platform, the master actor being configured to:
 coordinate execution of the simulated RTB process,
 aggregate data generated by the simulated RTB process,
 initiate each simulation by initializing at least two types of actors in response to the start message and transmitting respective messages to the at least two types of actors in the plurality of actors, and
 terminate the simulated RTB process in response to a termination condition, the termination condition comprising a threshold number of impressions being achieved during the simulated RTB process;

during the simulated RTB process, transmitting, by each actor, at least one message to another actor, each message representing a transaction between actors in the digital advertising system, and being at least partially based on the one or more configuration parameters of a respective actor; and logging data representative of transactions occurring during the simulated RTB process, the data being indistinguishable from production data.

16. The system of claim 15, wherein the simulated RTB process comprises a first message from the ad server actor to an advertiser actor requesting a bid, a second message from the advertiser actor to the ad server actor to provide a bid response, and a third message from the ad server actor to the site actor to return an ad from the advertiser actor.

17. The system of claim 15, wherein an ad server actor logs each of the transactions with a logger actor by transmitting respective messages to the logger actor.

18. The system of claim 15, wherein operations further comprise transmitting a message from an actor to a real-world, non-simulated system, and receiving, by the actor, a response message from the real-world, non-simulated system.

19. The system of claim 15, wherein the data representative of transactions occurring during the simulated RTB process is used to train one or more machine learning (ML) models.

20. The system of claim 15, wherein the data representative of transactions occurring during the simulated RTB process is used to test infrastructure of the digital advertising system.

* * * * *